A. C. GILBERT.
TOY CONSTRUCTION BLOCKS.
APPLICATION FILED JAN. 29, 1914.
Reissued Jan. 16, 1917.
14,250.
Fig. 1.
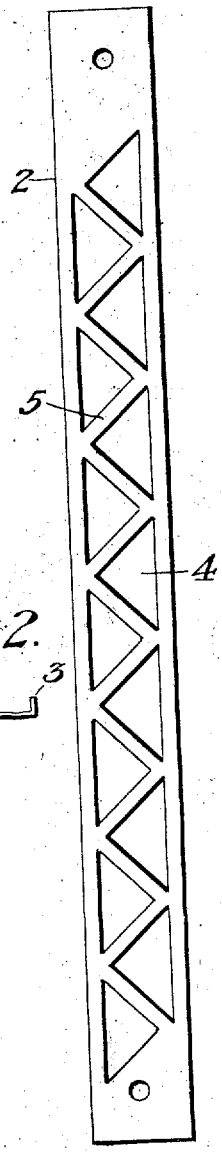
Fig. 2.
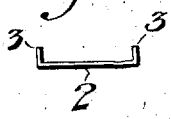
Fig. 3.
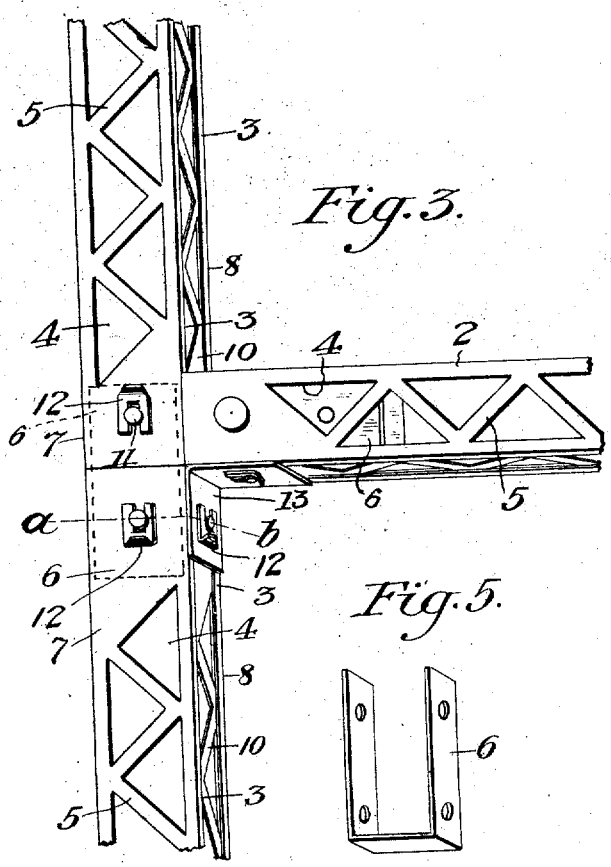
Fig. 5.
Fig. 4.
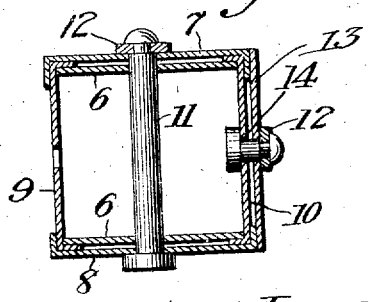
Witnesses.
H. E. Cooper.
M. O. Milhame
Inventor:
Alfred C. Gilbert,
by
Thos. E. Robinson
his Attorney.

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

TOY CONSTRUCTION-BLOCKS.

14,250. Specification of Reissued Letters Patent. Reissued Jan. 16, 1917.

Original No. 1,066,809, dated July 8, 1913, Serial No. 743,073, filed January 20, 1913. Application for reissue filed January 29, 1914. Serial No. 815,323.

*To all whom it may concern:*

Be it known that I, ALFRED C. GILBERT, a citizen of the United States, residing at New Haven, in the county of New Haven and State of Connecticut, have invented a new and useful Improvement in Toy Construction-Blocks; and I do hereby declare the following, when taken in connection with the accompanying drawings and the characters of reference marked thereon, to be a full, clear, and exact description of the same, and which said drawings constitute part of this application, and represent, in—

Figure 1 a face view of a toy construction block constructed in accordance with my invention. Fig. 2 an end view of the same. Fig. 3 a perspective view showing several blocks connected together. Fig. 4 a sectional view on the line *a—b* of Fig. 3. Fig. 5 a perspective view of the coupling-piece, detached.

This invention relates to an improvement in toy construction blocks, the object being to provide blocks by which toy structures of various kinds may be erected, the blocks simulating what is known as steel construction; and the invention consists in the construction as hereinafter described and particularly pointed out in the claims.

In carrying out my invention, I form the blocks from a strip or plate of sheet metal 2 preferably formed on opposite sides with inwardly turned flanges 3. Preferably portions of the central portion of the strip will be cut out forming openings 4 leaving diagonal sections 5 simulating the appearance of steel beams, though it is apparent that in certain aspects of the invention the character of the stamping may be varied at will, or the strips may be left uncut. In uniting these strips, four strips 7, 8, 9 and 10 are arranged as shown in Fig. 4 of the drawings around a U-shaped coupling piece 6 so as to form a rectangular block, the flanges of the strips 7 and 8 extending over the face of the strips 9 and 10, while through the strips 7 and 8 and through the sides of the coupling-piece 6 a bolt 11 is passed by which the four sections are interlocked with the coupling-piece. The coupling piece is as a matter of fact adapted to form a spacing member for the strips of two adjacent blocks, and to aid in coupling together the completed blocks one on top of the other, as shown by the dotted lines in Fig. 3. The strips of one block are assembled around the coupling piece and clamped in place by the bolt 11 with a part of the coupling piece projecting out of the open end of the block thus formed, and in order to couple a second block to the first, four more strips are grouped around the projecting end of the coupling piece and clamped in place by a second bolt passing through a second pair of perforations with which the coupling piece is provided. The bolt 11 may be held in place by a U-shaped clip 12 as clearly shown in Fig. 3 of the drawings, or the bolt may be threaded and a nut applied thereto. When arranging one section at right angles to another section, or for supporting the lower end of one section, an angle-piece 13 may be employed as shown in Fig. 3 of the drawings, this angle-piece being secured by bolts extending through the perforations 14 in opposite strips.

Referring to the vertical sections or blocks shown in Fig. 3, it will be observed that by placing two or more sections end to end and connecting them detachably together a toy or miniature box girder or column of greater length than either or any of the component sections may be built up, and in this manner the box-like structure can be extended to any desired length. In the particular form shown in Fig. 3, a lower miniature box girder section, composed of four sheet metal strips arranged in box-like form, and having means for detachably holding said strips in assembled relation, is connected endwise to an upper miniature box girder section composed of similar strips and having similar fastening means. A third section arranged horizontally and extending at right angles to the first sections is connected with said first sections by the angle piece 13 or similar means, as described. In the particular form shown, the means for holding or fastening together the strips of the upper vertical section at their lower ends, and the means for holding or fastening together the strips of the lower vertical section at their upper ends are also instrumental in interconnecting the two sections, as will be understood. When the coupling member is disconnected from the two sections, the strips of the respective sections are released from each other at the same time, and when the coupling member is detached from one section, the strips of at least one section are necessarily separated from each other. This construction facilitates the building up and the taking down of a miniature box girder composed of a plurality of different sections, as will be understood. However, while this feature is of importance in some aspects of the invention, it is unimportant in others, and various changes may be made in the arrangement of the sections and the means for fastening together the strips without departing from the invention. With a number of these strips which are of light construction and each of which is provided with an extended bearing surface having conveniently the centrally positioned aperture or perforation 14 for a fastening means various structures may be erected, such as frames for buildings, bridges, derricks, etc. These blocks or strips are readily stamped from sheet metal and can be packed into very small space for transportation. By providing the strips with the inwardly turned flanges, the strips are strengthened and two or more strips may be connected end to end so as to form a long rigid strip.

It will be noted from Fig. 4 that oppositely arranged strips having marginal flanges are connected by a single bolt, and that the box structure is completed by strips set in at the sides between the first named strips. The side strips are retained against outward displacement by the flanges of the strips connected by the bolt. Preferably all of the strips of the boxlike structure will have marginal flanges, and the flanges of each strip will overlap other strips in the manner shown. Each strip 2 is in effect a channeled bar of sheet metal having continuous angular side members connected integrally by truss members. When grouped together to form a boxlike structure as described four of the strips constitute in effect a box girder.

It will be obvious that the strips of each block or box girder may be moved laterally into assembled position, that they are freely separable from each other in a lateral direction, upon the removal of the bolts at the ends of the girder, and that all of the strips are interchangeable with each other. The strips 7, 8 which may be termed the outer strips, inasmuch as the inner strips 9, 10 are set in between them, may obviously be used as the inner strips and vice versa. Outward displacement of the inner pair of strips is prevented by the flanges of the outer strips, and inward displacement of the inner strips, which would cause the collapse of the block, is prevented by appropriate means which, in the case illustrated, is constituted by the spacing member 6. In other words, the girder when assembled is held against collapse under inward pressure, while the same is held in the hand, and the fastening bolts are placed in position. Each bolt 11 passes through and interconnects the outer pair of strips, and exerts inward pressure thereon to hold them firmly in position on the edge portions of the inner strips, which, in turn, are firmly held against the edge portions of the spacing member 6. In the broad aspects of the invention, however, I do not restrict myself to a separate spacing member, as other provisions can be made for attaining this end.

It will be apparent, of course, that by constructing each strip from sheet metal as described, such strip is given a light flexible character which adapts it well to the intended purpose, inasmuch as the strip is adapted to conform readily to other strips, and is more or less self-adjusting. By preference, the light flexible sheet metal strip has side flanges which are relatively shallow, as shown, so that a box girder may be readily formed from a plurality of such strips, and the flanges are preferably substantially coextensive with the side edges or margins of the strip. In other words, the flanges run to the end of the strip, as shown in Fig. 2, and at any rate, they will preferably extend as far toward the end of the strip as the bolt receiving perforation at that end of that strip as indicated in Fig. 4. By stamping out that portion of the strip, which is intermediate of the ends, the girder is given an openwork effect similar to that obtained in large structural work by the use of a large number of separate parts, and at the same time, the strip is made light and flexible without any appreciable decrease of strength owing to the provision of the transverse truss members of the lattice work. However, although I have described with considerable particularity the manner in which each strip is constructed, and the manner in which a plurality of such strips are built up to form a box girder, I wish to have it understood that various changes in the details may be made without departing from the scope of the invention as defined in the claims.

I claim:—

1. Toy construction blocks comprising strips each having inwardly turned flanges at the sides, said strips provided at opposite ends with perforations, combined with U-shaped coupling-pieces having perforations adapted to aline with the perforations in the strips, and bolts adapted to extend through the strips and coupling-pieces;

whereby four strips may be connected with a coupling-piece.

2. In a separable toy box girder, the combination of four miniature structural elements of identical cross-section arranged in box-like form, each of said elements constituted by a sheet metal strip, the end portions of which are provided with perforations, each strip provided at the side edges with means to engage the side edges of adjacent strips located laterally thereof so as to present relative displacement, said strips being movable laterally into the assembled position, and laterally separable from each other, two of said strips set in between the other two to space them apart, means for preventing the collapse of the structure by inward movement of the inner spacing strips, and detachable fastening means for holding the strips in assembled position, passing through the perforations in the other strips at the respective ends of the box-like structure; substantially as described.

3. Toy construction blocks comprising strips of sheet metal formed with inwardly turned edges and provided at opposite ends with perforations, U-shaped coupling-pieces around which four strips may be placed, means for interlocking said strips with the coupling-piece, and an angle-iron adapted to connect two or more blocks.

4. In a toy construction block, the combination of a pair of sheet metal channeled strips arranged with their channeled faces opposing each other, a second pair of similar channeled strips having their channeled faces opposing each other, said second strips set in between said first strips at right angles thereto and spacing apart said first strips, the strips of said second pair being held against outward displacement by engagement with the flanges of the first strips, means for holding said second strips from displacement in an inward direction, and means for detachably securing all of said strips together in the relation specified to form a separable toy girder; substantially as described.

5. In a toy construction block, the combination of a plurality of strips, each having inwardly turned side flanges, two of said strips facing each other to form an outer pair, and two of said strips set in between the first strips at right angles thereto so as to space the same apart, means for spacing apart the inner strips and preventing their displacement in an inward direction relative to the block, and means for securing all of said strips detachably together to form a separable toy girder; substantially as described.

6. A structural element for building up toy box girders, columns and the like comprising a miniature structural member having an elongated body part of flexible sheet metal with opposed angularly disposed edge flanges, said body part having a plurality of cut-out sections forming transversely disposed truss parts, said cut-out portion terminating a considerable distance from the ends of the body part to form extended bearing portions, and said extended bearing portions having a substantially centrally disposed aperture for the reception of means for uniting the member to another member or members whereby different composite and angularly arranged structures can be readily formed.

7. In a miniature toy form of box girder, the combination of a plurality of flexible structural elements of identical form in box like arrangement, each of said elements composed of a light flexible sheet metal strip having a plurality of openings formed therein throughout a considerable portion of its length to present transversely extending truss parts, like angularly disposed flanges at the edges of the strips for overlapping the body portions of the adjacent strips to hold the parts of the box like formation against relative displacement at the corners thereof and detachable fastening means for holding the respective strips separably together whereby a miniature girder can be readily formed.

8. In a toy girder construction, the combination of four like elongated flexible metal strips each strip having opposed inwardly extending side flanges and the said strips being arranged edge to edge to form a substantially rectangular girder with the flanges of one strip arranged to engage a side part of the adjacent strip and a single means at the end of the girder for securing all of the strips in their arranged positions.

9. In a toy girder construction, the combination of a section comprising four elongated yieldable sheet metal strips having cut-out parts intermediate the ends thereof to form transversely extending truss members, the said strips being arranged edge to edge to form a rectangular structure, and having side flanges each of which overlaps a part of the body portion of an adjacent strip, a second section of similar construction, the sections being arranged so that one constitutes a prolongation of the other, and common means for detachably securing the strips of one section in place and for securing the two sections together.

10. In a toy box girder, the combination of a girder section composed of four miniature structural elements each consisting of a sheet metal strip cut away throughout a considerable portion of its length so as to present integral transverse truss or connecting members, such strips arranged in box like form, flanges at the corners of the structure arranged to overlap the body portions of the respective adjacent strips to prevent relative displacement of the parts, a second box girder section similar to the first and having one end adjacent one end of the first section, and fastening means for holding the strips of each section in assembled position at the adjacent ends of the section and at the same time interconnecting the two sections, said fastening means being detachable for separating the sections from each other and simultaneously releasing the individual strips of at least one section from each other.

In witness whereof, I have hereunto set my hand on the 24th day of January, 1914.

ALFRED C. GILBERT.

Witnesses:
HENRY E. ROCKWELL.
M. OLIVE WILLIAMS.